March 22, 1949.
J. N. SWARR
2,464,999
ALTERNATING CURRENT GENERATOR
Filed June 10, 1947
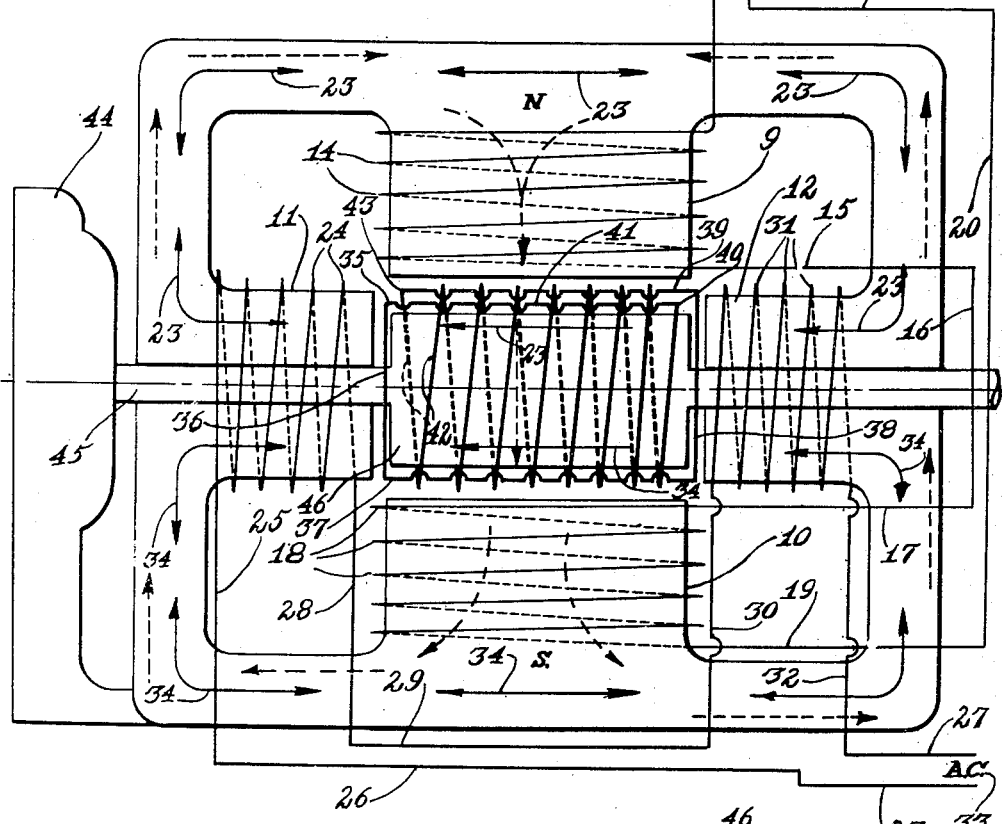
Fig. 1.
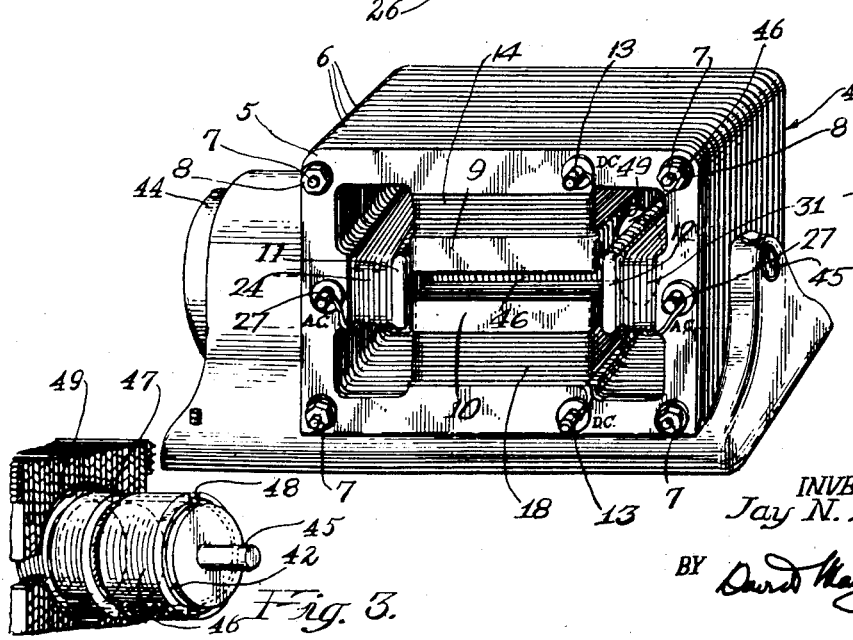
Fig. 2.
Fig. 3.
INVENTOR.
Jay N. Swarr
BY David Manley Heller
Attorney Patented Mar. 22, 1949

2,464,999

UNITED STATES PATENT OFFICE 2,464,999

ALTERNATING CURRENT GENERATOR

Jay N. Swarr, Evergreen Park, Ill.

Application June 10, 1947, Serial No. 753,695

15 Claims. (Cl. 171—252)

My invention relates to alternating current generators and has, for its principal object, the elimination of commutators, slip rings, and brushes, which are customarily employed in such constructions.

An important object of my invention is to provide a generator of the aforementioned character, which is preferably useful, and ideally constructed, for welding purposes where currents of high amperage have to be utilized because, under such conditions, brushes and slip rings are a limitation to the amount of amperage that can be passed therethrough; the brushes, slip rings, and commutators are usually considered the greatest source of trouble in maintenance of generators equipped with the same.

Another object of my invention is to provide a generator of the aforementioned character which is so constructed and arranged as to be highly efficient for the purposes for which it is to be used, and a structure which is simpler and will provide advantages of lightness and compactness especially desirable and suitable for aircraft generators.

Another object of my invention is to provide a generator of the aforementioned character which, by suitable connections, may be changed to operate as a synchronous motor.

A further object of my invention is to provide a structure of the aforementioned character which is simple in construction and economical to manufacture in quantity production.

Other objects and ancillary advantages resident in my invention will become apparent from an examination of the accompanying drawings, being further elucidated in the ensuing description, wherein like symbols are utilized to designate like parts, and in which:

Fig. 1 is an electrical wiring diagram indicating the wiring connections to be followed in constructing my alternating current generator.

Fig. 2 is a perspective view of an A. C. generator built in accordance with the teachings of my invention.

Fig. 3 is a fragmentary section, in perspective, of the stator and the rotor elements comprising my invention.

Referring to the drawings, my invention is generally designated 4, and consists of a stator 5, made up of a series of laminations 6, held compactly together by the tie rods 7 and the lock nuts 8. The laminations are cut out, as indicated, in order to form the poles 9, 10, 11, and 12. The poles 9 and 10 are designated respectively North and South, and have the terminal of the wiring therefrom connected to binding posts 13, to which a suitable source of D. C. current is connected. The binding posts 13 are connected by a suitable source of D. C. voltage 22; one of the leads 13 is continued to form a series of windings 14 about the North pole of the device; the last turn thereof being connected through the wiring 15, 16, and 17 to form a series of windings 18 or the South pole of the generator, the last coil of the winding 18 being connected through the lines 19, 20, and 21 back to the other lead 13, thus completing the circuit.

A series of windings are wound about the poles 11 and 12, creating an independent circuit through which the induced A. C. current is delivered to some external instrumentality interposed at the point 33 between the leads 27. The coils 24 are wound about the pole 11 and are connected through the wiring 25 and 26 to one of the terminals 27, whereas the coil at the other end of the windings 24 is connected through lines 28, 29, and 30 to the coil windings 31 on the pole 12; the last coil of the winding 31 being connected through line 32 to the other lead line 27.

The rotor consists of a shaft 45 having compactly mounted thereon a series of laminations of larger diameter, designated 46; the said rotor 46 being provided with a series of radially slotted portions in which a number of coils 42 are wound; the winding consisting of the coils 42 having its axis coincident with the axis of rotation. These turns 42 are connected in series to one and one-half turns, having their axis normal to the axis of rotation and is indicated by the coil starting at 40, continuing through the longitudinal winding 41, bent at 35, connected to the winding portion 36, thence connected to the winding portion 37 connected to the winding portion 38, in turn connected to the winding portion 39, which at 43 is ultimately connected to the windings 42, the terminus of the windings 42 being connected at 40 to the winding portion 41. The rotor, through its shaft 45, is mounted to rotate in suitable bearings bored out in the stator, the stator being also arcuately cut at 49, providing sufficient clearance for the rotor body and being as close as is deemed consistent with electrical manufacturing practice.

The rotor 46, through its shaft 45, is connected to a prime mover 44 which will provide rotation and motivation to the rotor 46. Thus, the device generally consists of a stator, or stationary structure, which forms a path for the magnetic flux and, at the same time, supports the electrical coils as indicated. There are, as can be seen, two separate windings on the rotor. One winding has its axis coincident with the axis of rotation and is indicated by the turns 42; the other winding has its axis normal to the axis of rotation and is indicated by turns 36, 37, 38, 39, and 41.

The field poles N. and S. are excited with direct current. The paths of the magnetic flux resulting from this excitation are shown by the dotted line single headed arrows on Fig. 1. These poles, when considered with the rotor windings 36, 37, 38, 39, 40, and 41, form a standard D. C. excited single phase A. C. generator and rotation of the said rotor will induce an alternating voltage in the normal rotor winding composed of turns 36, 37, 38, 39, 40, and 41, the frequency of which will be determined by the speed of rotation. The magnetic field of the North and South poles has no flux linkage with any of the turns 42 and, hence, no voltage is induced in these turns. The coil consisting of turns 42 is connected in series with the coil consisting of turns 36, 37, 38, 39, 40, and 41, so that the alternating voltage which is induced in the said last mentioned turns causes an alternating current to flow in the coil of turns 42. This alternating current produces an alternating magnetomotive force in an axial direction which produces an alternating magnetic flux which flows through the magnetic circuit indicated by the solid line double headed arrows 23 and 34. This flux induces an alternating voltage in the stationary coils wound about the poles 11 and 12, which will cause an alternating current to flow in any external circuit 33 connected to these coils. The alternating magnetic flux flowing axially through the rotor has no linkage with the coils composed of turns 36, 37, 38, 39, 40, and 41; hence the voltage generated in this coil is unaffected by this flux.

Thus, at any instant, the total magnetic flux in the rotor is made up of two components. The first component is normal to the axis of rotation and hence has no effect on the axial coil. The magnitude of this normal component is directly proportional to the magnetomotive force produced by the field coils N. and S., and inversely proportional to the reluctance of the magnetic circuit through which this normal component of the flux flows. The second component is axial in direction and hence has no effect on the normal coil. Its magnitude is directly proportional to the instantaneous magnetomotive force produced by the current flowing in the axial coil and inversely proportional to the reluctance of the magnetic circuit through which this axial component of the flux flows. Thus, the two magnetic components are entirely independent of each other and the voltages induced in each of the two rotor windings are independent of the magnetic fields associated with the other. The rotor may be constructed, as shown in Fig. 3, wherein circumferential slots 47 are provided for the turns 42, while longitudinal slots 48 parallel with the axis of the rotor are provided for the turns 36, 37, 38, 39, 40, and 41.

While the rotor winding is illustrated as having a large number of turns, this construction is not absolutely necessary. For maximum efficiency, the primary requirement is that the impedance of the axial rotor winding be equal to the impedance of the normal winding. This requirement could be met by having only one turn of a large conductor for each winding.

The construction, as illustrated, is to be deemed as only one of a number of possible forms which the device may assume in actual practice. Coils 24 and 31, for example, can be mounted anywhere on the alternating flux circuit, also the magnetic circuit for the N. S. field could be completely divorced from the circuit for the alternating flux field except where the two intersect at the rotor. These and other possible variations are variations in design only and not in the basic principles of my invention.

While the illustration shows a bi-polar machine, it will be evident from an inspection of the drawings that it can as well be designed to have any even number of poles. The foregoing description, although it covers the operation of the device as an A. C. generator, it will be readily recognized, by persons familiar with the art, that if an A. C. voltage be applied to the A. C. terminals 27 at 33 while the N. S. field is present, the unit will operate as a synchronous motor.

Having thus disclosed and revealed my invention, what I claim as new and desire to secure by Letters Patent is:

1. An alternating current generator comprising, a stator having north and south poles and polar bearing extensions in transverse relationship with the said poles, a rotor mounted in the said bearing extensions, a source of D. C. current connected to the said north and south poles, an armature on the said rotor having at least one winding on the said armature coincident with the axis of the said rotor, at least one winding on the said armature normal to the axis of the said rotor and connected in series with the said first-mentioned winding, and a secondary transformer winding coiled about the said polar bearing extensions.

2. An alternating current generator comprising, a stator having north and south poles and polar bearing extensions in transverse relationship with the said poles, a rotor mounted in the said bearing extensions, a source of D. C. current connected to the said north and south poles, an armature on the said rotor having at least one winding on the said armature coincident with the axis of the said rotor, at least one winding on the said armature normal to the axis of the said rotor and connected in series with the said first-mentioned winding, and a secondary transformer winding coiled about the said polar bearing extensions, the said first-mentioned winding acting as a primary in concert with the said secondary transformer winding to form a transformer structure.

3. An alternating current generator comprising, a stator having north and south poles and polar bearing extensions in transverse relationship with the said poles, a rotor mounted in the said bearing extensions, a source of D. C. current connected to the said north and south poles, an armature on the said rotor having at least one winding on the said armature coincident with the axis of the said rotor, at least one winding on the said armature normal to the axis of the said rotor and connected in series with the said first-mentioned winding, a secondary transformer winding coiled about the said polar bearing extensions, and a prime mover connected to the said rotor to motivate the same.

4. An alternating current generator comprising, a stator having north and south poles and polar bearing extensions in transverse relationship with the said poles, a rotor mounted in the said bearing extensions, a source of D. C. current connected to the said north and south poles, an armature on the said rotor having at least one winding on the said armature coincident with the axis of the said rotor, at least one winding on the said armature normal to the axis of the said rotor and connected in series with the said first-mentioned winding, a secondary transformer winding coiled about the said polar bearing extensions, the said first-mentioned winding acting as a primary in concert with the said secondary transformer winding to form a transformer structure, and a prime mover connected to the said rotor to motivate the same.

5. An alternating current generator comprising, a stator having north and south poles and polar bearing extensions in transverse relationship with the said poles, a rotor mounted in the said bearing extensions, a source of D. C. current connected to the said north and south poles, an armature on the said rotor having at least one winding on the said armature coincident with the axis of the said rotor, at least one winding on the said armature normal to the axis of the said rotor and connected in series with the said first-mentioned winding, and a secondary transformer winding coiled about the said polar bearing extensions, the said stator and the said armature being of laminar construction.

6. An alternating current generator comprising, a stator having north and south poles and polar bearing extensions in transverse relationship with the said poles, a rotor mounted in the said bearing extensions, a source of D. C. current connected to the said north and south poles, an armature on the said rotor having at least one winding on the said armature coincident with the axis of the said rotor, at least one winding on the said armature normal to the axis of the said rotor and connected in series with the said first-mentioned winding, and a secondary transformer winding coiled about the said polar bearing extensions, the said first-mentioned winding acting as a primary in concert with the said secondary transformer winding to form a transformer structure, the said stator and the said armature being of laminar construction.

7. An alternating current generator comprising, a stator having north and south poles and polar bearing extensions in transverse relationship with the said poles, a rotor mounted in the said bearing extensions, a source of D. C. current connected to the said north and south poles, an armature on the said rotor having at least one winding on the said armature coincident with the axis of the said rotor, at least one winding on the said armature normal to the axis of the said rotor and connected in series with the said first-mentioned winding, a secondary transformer winding coiled about the said polar bearing extensions, and a prime mover connected to the said rotor to motivate the same, the said stator and the said armature being of laminar construction.

8. An alternating current generator comprising, a stator having north and south poles and polar bearing extensions in transverse relationship with the said poles, a rotor mounted in the said bearing extensions, a source of D. C. current connected to the said north and south poles, an armature on the said rotor having at least one winding on the said armature coincident with the axis of the said rotor, at least one winding on the said armature normal to the axis of the said rotor and connected in series with the said first-mentioned winding, a secondary transformer winding coiled about the said polar bearing extensions, the said first-mentioned winding acting as a primary in concert with the said secondary transformer winding to form a transformer structure, and a prime mover connected to the said rotor to motivate the same, the said stator and the said armature being of laminar construction.

9. An alternating current generator comprising, a stator having north and south poles and polar bearing extensions in transverse relationship with the said poles, a rotor mounted in the said bearing extensions, a source of D. C. current connected to the said north and south poles, an armature on the said rotor having at least one winding on the said armature coincident with the axis of the said rotor, at least one winding on the said armature normal to the axis of the said motor and connected in series with the said first-mentioned winding, a secondary transformer winding coiled about the said polar bearing extensions, the said stator and the said armature being of laminar construction, and an electrical instrumentality interposed between the terminals of the said secondary transformer winding.

10. An alternating current generator comprising, a stator having north and south poles and polar bearing extensions in transverse relationship with the said poles, a rotor mounted in the said bearing extensions, a source of D. C. current connected to the said north and south poles, an armature on the said rotor having at least one winding on the said armature coincident with the axis of the said rotor, at least one winding on the said armature normal to the axis of the said rotor and connected in series with the said first-mentioned winding, a secondary transformer winding coiled about the said polar bearing extensions, the said first-mentioned winding acting as a primary in concert with the said secondary transformer winding to form a transformer structure, the said stator and the said armature being of laminar construction, and an electrical instrumentality interposed between the terminals of the said secondary transformer winding.

11. An alternating current generator comprising, a stator having north and south poles and polar bearing extensions in transverse relationship with the said poles, a rotor mounted in the said bearing extensions, a source of D. C. current connected to the said north and south poles, an armature on the said rotor having at least one winding on the said armature coincident with the axis of the said rotor, at least one winding on the said armature normal to the axis of the said rotor and connected in series with the said first-mentioned winding, a secondary transformer winding coiled about the said polar bearing extensions, a prime mover connected to the said rotor to motivate the same, the said stator and the said armature being of laminar construction, and an electrical instrumentality interposed between the terminals of the said secondary transformer winding.

12. An alternating current generator comprising, a stator having north and south poles and polar bearing extensions in transverse relationship with the said poles, a rotor mounted in the said bearing extensions, a source of D. C. current connected to the said north and south poles, an armature on the said rotor having at least one winding on the said armature coincident with the axis of the said rotor, at least one winding on the said armature normal to the axis of the said rotor and connected in series with the said first-mentioned winding, a secondary transformer winding coiled about the said polar bearing extensions, the said first-mentioned winding acting as a primary in concert with the said secondary transformer winding to form a transformer structure, a prime mover connected to the said rotor to motivate the same, the said stator and the said armature being of laminar construction, and an electrical instrumentality interposed between the terminals of the said secondary transformer winding.

13. An alternating current generator comprising, north and south poles, a coil rotating about an axis which is normal to the magnetic flux flowing between said north and south poles, said coil mounted so that the axis of its magnetic field is coincident with the axis of rotation, a second coil rotating about the same axis as the said first-mentioned coil but arranged so that the axis of the magnetic field produced by said second coil is normal to the said axis of rotation, both of the said rotating coils being connected in series, a stationary core of magnetic material arranged to complete the magnetic circuit for the flux produced by the said first-mentioned coil, and a stationary coil mounted so as to link the magnetic flux in said stationary core.

14. An alternating current generator comprising, north and south poles, a coil rotating about an axis which is normal to the magnetic flux flowing between said north and south poles, said coil mounted so that the axis of its magnetic field is coincident with the axis of rotation, a second coil rotating about the same axis as the said first-mentioned coil but arranged so that the axis of the magnetic field produced by said second coil is normal to the said axis of rotation, both of the said rotating coils being connected in series, a closed stationary core of magnetic material having one leg mounted on the center of rotation of the said rotating coils and forming a stationary core within the said coils, the remainder of the stationary core arranged to form a closed magnetic circuit for the flux produced by the said first-mentioned coil, and a stationary coil mounted so as to link the magnetic flux in said stationary core.

15. An alternating current generator comprising, north and south poles, a cylindrical rotor mounted with its axis of rotation normal to the path of the magnetic flux produced by the said north and south poles, a source of D. C. current to excite said north and south poles, an armature on said rotor having at least one winding arranged to produce a magnetic field the axis of which is coincident with the axis of rotation of said rotor, at least one winding arranged to produce a magnetic field the axis of which is normal to the axis of rotation of said rotor and connected in series with the first-mentioned winding, a stationary core of magnetic material arranged to complete the magnetic circuit for the flux produced by the said first armature winding, and a stationary coil mounted so as to link the magnetic flux in said stationary core.

JAY N. SWARR.

REFERENCES CITED

The following references are of record in the file of this patent:

UNITED STATES PATENTS

| Number | Name | Date |
| --- | --- | --- |
| 429,736 | Pfund | June 10, 1890 |
| 595,412 | Rice | Dec. 14, 1897 |
| 1,160,087 | Neuland | Nov. 9, 1915 |
| 1,659,729 | Gannett | Feb. 21, 1928 |